(12) United States Patent
Slabaugh et al.

(10) Patent No.: US 9,376,960 B2
(45) Date of Patent: Jun. 28, 2016

(54) HEAT TRANSFER AUGMENTED FLUID FLOW SURFACES

(75) Inventors: Carson D. Slabaugh, West Lafayette, IN (US); Jayanta S. Kapat, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1080 days.

(21) Appl. No.: 13/189,221

(22) Filed: Jul. 22, 2011

(65) Prior Publication Data

US 2012/0017605 A1    Jan. 26, 2012

Related U.S. Application Data

(60) Provisional application No. 61/367,124, filed on Jul. 23, 2010.

(51) Int. Cl.
| | |
|---|---|
| F02C 7/14 | (2006.01) |
| F28F 3/04 | (2006.01) |
| F28F 13/12 | (2006.01) |
| F02C 7/141 | (2006.01) |

(52) U.S. Cl.
CPC . *F02C 7/141* (2013.01); *F28F 3/04* (2013.01); *F28F 13/12* (2013.01); *F05D 2250/611* (2013.01); *F05D 2260/20* (2013.01); *F05D 2260/2214* (2013.01); *F28F 3/044* (2013.01)

(58) Field of Classification Search
CPC ........... F28F 13/02; F28F 13/04; F28F 13/12; F28F 13/125; F28F 13/044; F28F 13/046; F28F 13/048; F23R 3/00; F23R 3/002; F23R 3/005; F23R 3/007; F23R 3/02; F23R 3/04; F23R 3/045; F23R 3/06; F23R 3/08; F23R 3/10; F23R 3/12; F23R 3/14; F23R 3/16; F23R 3/42; F23R 3/425; F23R 3/44; F23R 3/46; F23R 3/50; F23R 3/60
USPC ........... 60/752, 753, 754, 755, 756, 757, 758, 60/759, 760; 165/109.1
See application file for complete search history.

(56) References Cited

U.S. PATENT DOCUMENTS

| | | | | | |
|---|---|---|---|---|---|
| 1,848,375 | A | * | 3/1932 | Muir | 165/153 |
| 4,930,729 | A | * | 6/1990 | Savill | 244/200 |
| 5,577,555 | A | * | 11/1996 | Hisajima et al. | 165/133 |
| 5,769,155 | A | * | 6/1998 | Ohadi et al. | 165/109.1 |
| 5,791,405 | A | * | 8/1998 | Takiura et al. | 165/184 |
| 6,145,319 | A | * | 11/2000 | Burns et al. | 60/755 |
| 6,298,909 | B1 | * | 10/2001 | Fukatami et al. | 165/133 |
| 6,582,584 | B2 | * | 6/2003 | Lee et al. | 205/660 |
| 6,589,600 | B1 | * | 7/2003 | Hasz et al. | 427/264 |

(Continued)

OTHER PUBLICATIONS

P.M. Ligrani, et al., "Comparison of Heat Transfer Augmentation Technique", AIAA Journal, vol. 41, No. 3, Mar. 2003, pp. 337-362.

*Primary Examiner* — Phutthiwat Wongwian
*Assistant Examiner* — Rene Ford
(74) *Attorney, Agent, or Firm* — Jetter & Associates, P.A.

(57) ABSTRACT

A heat transfer augmented channel wall includes a bulk portion, a wall surface and a plurality of multi-portion indented features extending from the wall surface into the bulk portion. The multi-portion indented features include a first indented portion and a second indented portion that are divided by a ridge which disrupts fluid flow between first and second indented portions. The ridge has a height that is less than a maximum depth of the multi-portion indented features.

15 Claims, 8 Drawing Sheets

(56) References Cited

U.S. PATENT DOCUMENTS

| | | | |
|---|---|---|---|
| 6,722,134 B2* | 4/2004 | Bunker | 60/752 |
| 6,761,031 B2* | 7/2004 | Bunker | 60/752 |
| 7,104,067 B2* | 9/2006 | Bunker | 60/752 |
| 7,992,625 B1* | 8/2011 | Spokoiny et al. | 165/80.4 |
| 8,128,399 B1* | 3/2012 | Gibson et al. | 431/8 |
| 2004/0182556 A1* | 9/2004 | Jahn et al. | 165/166 |
| 2005/0106021 A1 | 5/2005 | Bunker et al. | |
| 2006/0099073 A1 | 5/2006 | Djeridane et al. | |
| 2012/0318485 A1* | 12/2012 | Yabe et al. | 165/152 |

\* cited by examiner

HEAT TRANSFER AUGMENTED FLUID FLOW SURFACES

CROSS REFERENCE TO RELATED APPLICATIONS

This application claims the benefit of Provisional Application Ser. No. 61/367,124 entitled "HEAT TRANSFER AUGMENTED FLUID FLOW SURFACES", filed Jul. 23, 2010, which is herein incorporated by reference in its entirety.

TECHNICAL FIELD

Disclosed embodiments relate to fluid flow devices, more particularly heat transfer augmented fluid flow devices having surfaces including recessed surface features that improve convective heat transfer.

BACKGROUND

In technologies involving heat transfer, to improve cooling efficiency, dimples or other concave features may be added to fluid flow surfaces, such as within a turbine engine. Dimples promote turbulent mixing in the flow, specifically in the near wall region where boundary layer development can act to restrict heat transfer. The turbulence created causes mixing of the fluid which increases convective heat transfer efficiency within the system. Simultaneously, little loss in dynamic energy is realized.

Examples of large scale machineries with hot components that could benefit from improved cooling are turbine blades in the case of a turbine engine or the stator of a large-scale power generator. By increasing the thermal efficiency of the system, more heat can be removed by the cooling fluid flow which will decrease the temperatures of cooled components. Decreased component temperatures allow for longer component life and reduced wear on the components. An increase in cooling efficiency will translate into a cost savings by increasing component life and improving power output for specific fuel consumption.

Generally, the shape of the dimple governs the flow physics that promote turbulent mixing within the flow. A variety of shapes of dimples are known, including spherical (symmetric) and some asymmetric shapes. In general, these features have a strong correlation between improved heat transfer performance and increased pressure loss through the cooling channel. As a result, known dimple shapes generally all lack the ability to significantly augment the flow to increase heat transfer efficiency without substantial loss in flow potential.

SUMMARY

Disclosed embodiments include heat transfer augmenting channel walls comprising multi-portion indented features for use in systems involving heated internal fluid flows. A plurality of multi-portion indented features are recessed from the wall surface into a bulk portion of the channel wall. The multi-portion indented features have a maximum depth and comprise a first indented portion and at least a second indented portion that are divided by a ridge at their intersection. The ridge partially blocks the fluid flow between the first and second indented portions and has been found to significantly reduce the size of the recirculation zone. The ridge has a height that is less than the maximum depth of the multi-portion indented features.

Also disclosed is a turbine engine system that utilizes at least one disclosed heat transfer augmented channel wall.

Further disclosed is a method of increasing heat transfer from surfaces exposed to a flow path of hot gases that utilize disclosed heat transfer augmenting channel walls.

BRIEF DESCRIPTION OF THE DRAWINGS

FIGS. 5A-C show top, side and bottom channel wall Nusselt number coefficient test data as a function of wall position at channel Reynolds numbers of 20000, 30000, and 40000, respectively, where the bottom wall included disclosed DD features, while

DETAILED DESCRIPTION

Figure 1A:
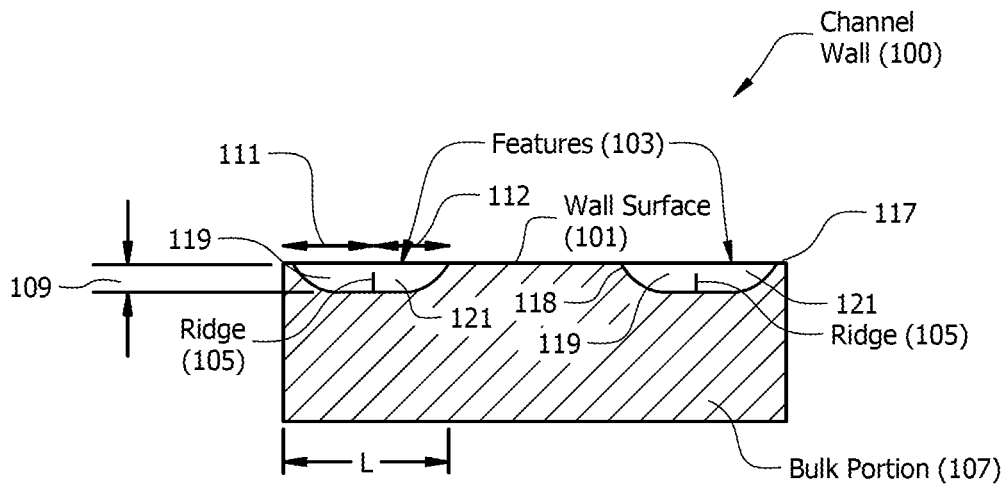
FIG. 1A is a cross-sectional view of a portion of an example channel wall having a plurality of disclosed flow augmenting multi-portion indented features, according to an example embodiment.

Disclosed embodiments in this disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 1B:
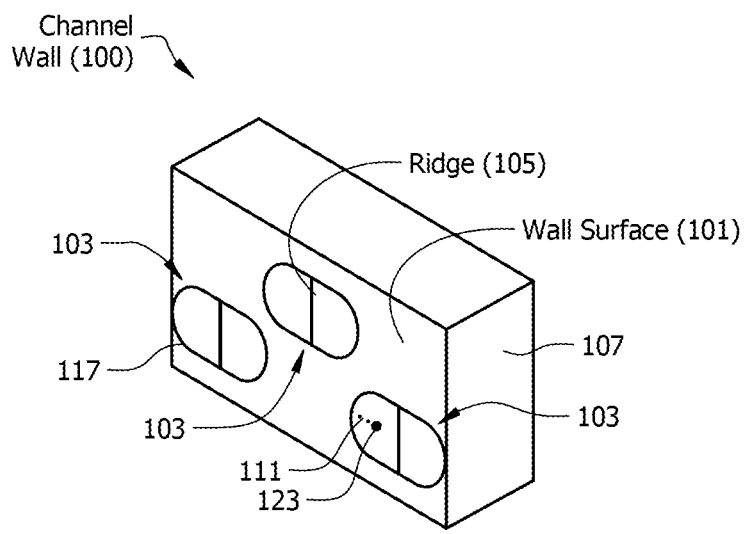
FIG. 1B is a perspective view of the embodiment of FIG. 1A.
Figure 1C:
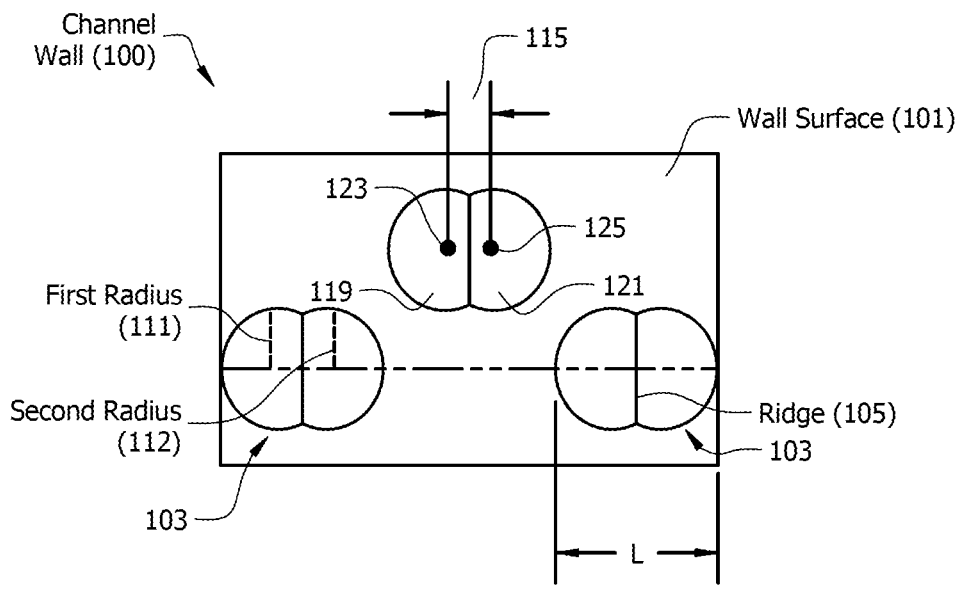
FIG. 1C is a top view of the embodiment of FIG. 1A.

FIGS. 1A-C provides several views of the surface of an example channel wall having a plurality of flow augmenting multi-portion indented features shown as intersecting double dimples, according to an example embodiment. FIG. 1A is a cross-sectional view, FIG. 1B is a perspective view, while FIG. 1C is a top view. Although the FIGS. herein show at most three (3) flow augmenting multi-portion indented features, the plurality of flow augmenting multi-portion indented features generally number in the hundreds or thousands, and can be arranged in a two-dimensional array that that spans substantially the entire area of at least one channel wall (e.g., bottom wall).

Embodied as intersecting double dimples, each dimple is formed (e.g., machined) with a sufficiently close proximity to each other dimple so that they intersect, thus forming a ridge at the plane of intersection. In the particular embodiment where the dimples are hemispherical, the ridges are semicircular ridges.

FIG. 1A is a cross sectional view of a portion of an example channel wall 100 comprising a bulk portion 107 and a wall surface 101, and a plurality of multi-portion indented features 103 shown as intersecting double dimples recessed from the wall surface 101 into the bulk portion 107. The multi-portion indented features 103 have a maximum depth 109 measured from the wall surface 101 and comprise at least a first indented portion 119 and a second indented portion 121 that are divided by a ridge 105 that has a height that is less than the maximum depth 109 so that it partially (but not completely) blocks a fluid flow between the first and second indented portions 119, 121.

The first and second indented portions 119, 121 each can have a variety of shapes, that may be the same, but are not necessarily the same. Shapes for disclosed multi-portion indented features include can be based on volumes having cross sectional shapes comprising polygons including triangular and rectangular, oval, or oblong, or comprise semispherical shape features. Semispherical shape features are defined herein as volumes having elliptical cross sections, where elliptical shapes include a super ellipse defined as a geometrical figure which in a Cartesian coordinate system can be described as the set of all points (x,y) with $$|x/a|^n+|y/b|^n=1$$

where n>0 and a and b are the radii of the oval shape. The specific case of n=2 yields an ordinary ellipse; increasing n beyond 2 yields hyper ellipses which increasingly resemble rectangles; decreasing n below 2 yields hypo ellipses which develop pointy corners in the x and y directions and increasingly resemble a cross. In one particular embodiment the semispherical shape is hemispherical.

In the case of semispherical shapes, the first and second semimajor axes 111, 112 may or may not be equal. In some embodiments the first and second indented portions 119, 121 can have elliptical cross sections which as known in geometry can be defined by a semimajor axis and a semiminor axis, that are one half of the major and minor diameters, respectively. In the case the first and second indented portions 119, 121 are hemispherical and thus have circular cross sections the first and second semimajor axes become first and second radius 111, 112, and the semimajor axes and semiminor axis for the first and second indented portions 119, 121 become equal in length.

The height of the ridge 105 is a function of the combined relationship between several indented feature parameters, such as cross sectional dimension (e.g. radius) of indented portions 119, 121, and the spacing between the indented portions 119 and 121. As noted above, the ridge 105 has a height less than the maximum depth 109 of the multi-portion indented features 103. The height of the ridge 105 is in a range from 0.1% to 99.9% of the maximum depth 109, and typically extends from the base of the multi-portion indented features 103 from the position of maximum depth 109 up to 20 to 80% of the maximum depth 109. The ridges 105 can be defined by the intersection of the first and the second indented portions 119, 121. As shown in FIGS. 1B and 1C, the ridges 105 extend across the full width of the multi-portion indented features 103.

In typical embodiments the channel wall 100 comprises a thermally conductive material, such as provided by most metals or metal alloys, defined herein as a material providing a 25° C. thermal conductivity of ≥10 W/m·K. The first indented portion 119 may have a first rim 117, wherein the first rim 117 comprises a first intersection, or a meeting curve, of the first indented portion 119 and the wall surface 101.

In embodiments in which the first and second indented portions 119, 121 are hemispherical, the first rim 117 may have a first circular profile comprising a first radius 111 and a first midpoint 123 as shown in the perspective view shown in FIG. 1B. The second indented portion 121 may have a second rim 118, wherein the second rim 118 comprises a second intersection, or meeting curve, of the second indented portion 121 and the wall surface 101. The second rim 118 may have a second circular profile comprising a second radius 112 and a second midpoint 125 (second midpoint 125 shown in FIG. 1C). In some embodiments, the first midpoint 123 and the second midpoint 125 may have a distance apart 115 that is less than a sum of the first radius 111 and the second radius 112. The distance apart 115 is greater than zero.

In some elliptical cross section embodiments the first semimajor axes 111 and the second semimajor axes radius 112 are substantially equal in size. "Substantially equal" as used herein means a size within 2% of one another.

A coolant path for flowing coolant fluid through can be thermally coupled to the plurality of multi-portion indented features 103. For example, although not shown, a coolant path having a coolant fluid flowing therethrough could be run over or through the bulk portion 107 of the channel wall 100.

In some embodiments, the length dimension (L) of the multi-portion indented features 103 may be aligned parallel to a fluid flow direction in the fluid flow apparatus. In other words, the multi-portion indented features 103 can be aligned lengthwise (L) with the fluid flow so that the ridge 105 is substantially perpendicular to the fluid flow direction. In some embodiments, the length dimension of the multi-portion indented features 103 may be aligned so that they are angled with respect to a fluid flow direction in the fluid flow apparatus, such as at an angle of 2 degrees to 60 degrees with respect to the fluid flow direction.

The flow channel defined by the top, bottom and side channels walls in which fluid is flowing may generally take any cross sectional shape, such as rectangular, spherical, etc. In some embodiments, the flow channel may comprise a rectangular duct including a bottom wall, a first side wall, a second side wall and a top wall. In this case, the wall surface may have a planar shape. The channel wall 100 including disclosed multi-portion indented features 103 can be included with any one of the above walls alone, or it can be included with any combination of the above walls.

Figure 1D:
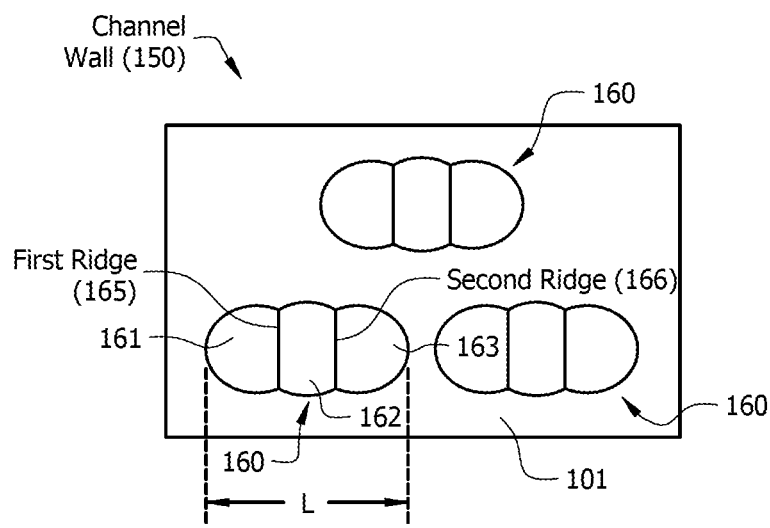
FIG. 1D is a top view of a portion of an example channel wall having a plurality of disclosed flow augmenting multi-portion indented features, according to another example embodiment.

FIG. 1D is a top view of a portion of an example channel wall 150 having a plurality of disclosed flow augmenting multi-portion indented features shown as intersecting triple dimples 160, according to another example embodiment. Triple dimples 160 include first indented portion 161, second indented portion 162, third indented portion 163, a first ridge 165 separating the first indented portion 161 and second indented portion 162, and a second ridge 166 separating second indented portion 162 and third indented portion 163. The ridges 165, 166 are defined by the intersection of the adjacent indented portions.

The change in shape from conventional single dimples to disclosed multi-portion indented features such as double dimples or triple dimples along a flow channel wall creates an increase in the streamwise length (L) of the feature as compared to a convention single spherical dimple. For example, as disclosed above, disclosed multi-portion indented features incorporate at least two spherical dimples into one feature, creating at least one ridge between the upstream and downstream dimple that does not exist in a single dimple feature. The ridge(s) partially disrupts the fluid flow and significantly reduces the size of the recirculation zone.

Figure 2A:
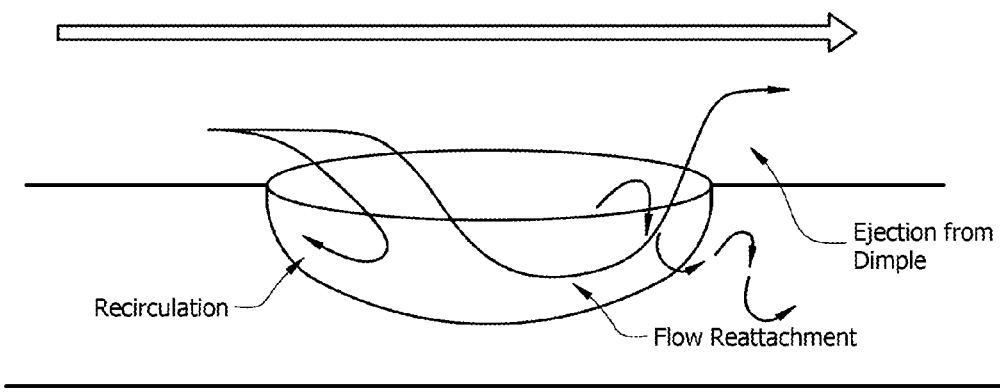
FIGS. 2A and 2B are flow structure depictions for a conventional single dimple feature and a disclosed flow augmenting multi-portion indented feature comprising a double dimple, respectively.
Figure 2B:
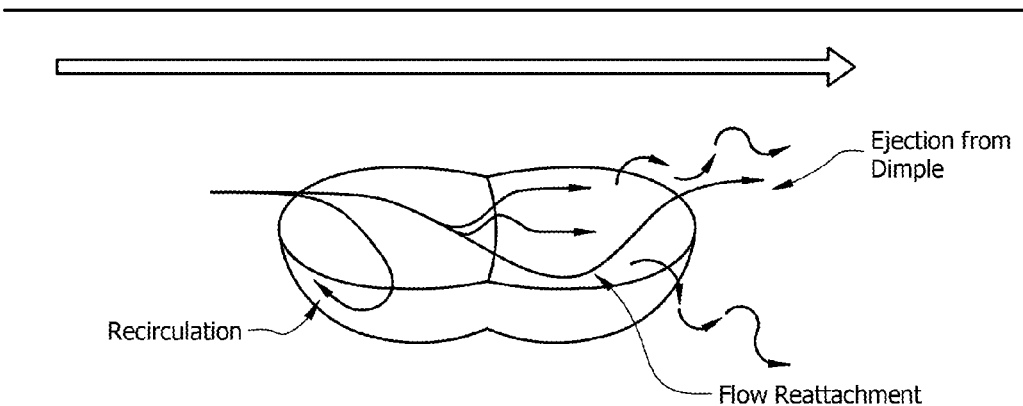

In addition, the increased streamwise length (L) of disclosed multi-portion indented features allows for the fluid flow to enter and exit the dimpled feature more gradually (no large angle ejection) and have a better flow reattachment than seen in the single dimple. FIGS. 2A and 2B are flow structure depictions for a conventional single dimple feature and a disclosed flow augmenting multi-portion indented feature comprising a double dimple, respectively. The fluid flow for the conventional single dimple depicted in FIG. 2A is provided as a reference. As depicted in FIG. 2B, disclosed double dimples advantageously provide fluid flow entry and exit more gradually (lower angle ejection), and have a better flow reattachment than that provided by the conventional single dimple.

In the case of a rectangular duct where the bottom wall has an array of multi-portion indented features as described above, it has been confirmed experimentally (described below relative to FIG. 4) that by placing a plurality of multi-portion indented features 103 on the bottom channel wall, thermal efficiency unexpectedly also increases on the top wall and side walls quite significantly where no multi-portion indented features 103 were placed. The ability of disclosed multi-portion indented features 103 on one wall to invoke augmented heat transfer participation of unfeatured surfaces on other walls is highly unexpected, and is highly desirable as it provides augmented heat transfer.

Figure 3:
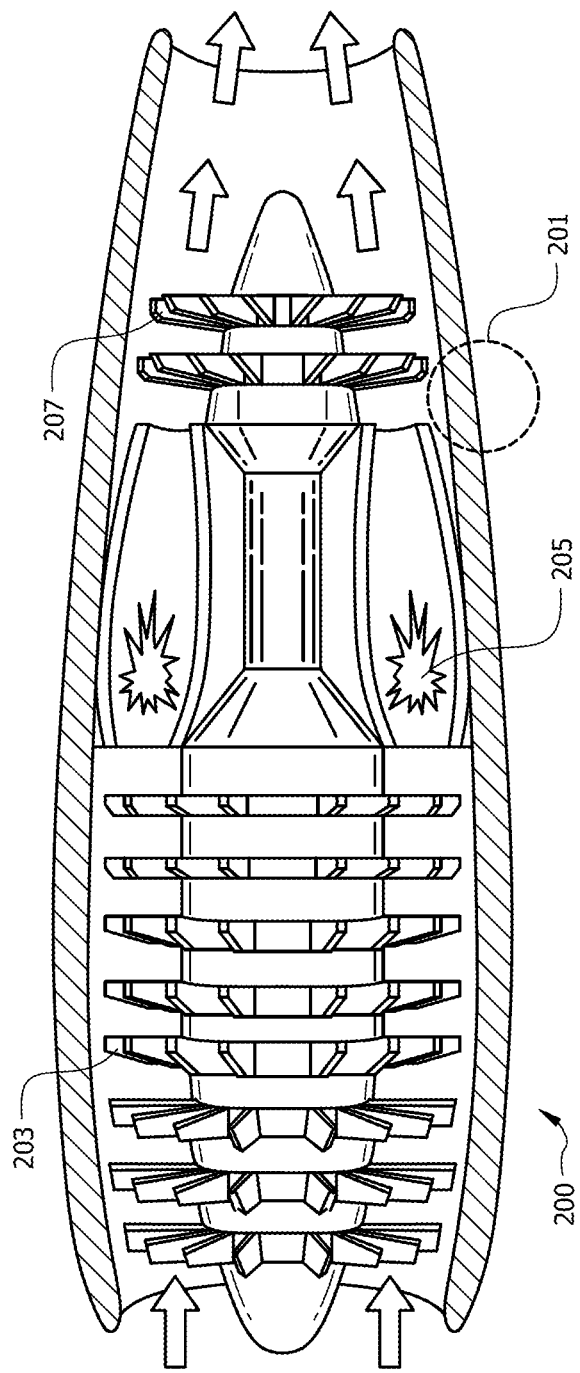
FIG. 3 is a depiction of a turbine engine comprising a heat transfer augmented surface having a disclosed channel wall including flow augmenting multi-portion indented features in a fluid flow path, according to an example embodiment.

Disclosed embodiments include systems and apparatus including channels walls comprising disclosed multi-portion indented features, such as a turbine engine comprising a compressor for pressurizing air to generate compressed air, a combustor for mixing the compressed air with a fuel and combusting for generating a stream of hot combustion gases, and a turbine section for extracting energy from the stream of hot combustion gases. Such a turbine may have a cylindrical channel wall based on disclosed channel walls comprising disclosed multi-portion indented features. FIG. 3 shows a depiction of a turbine engine 200 comprising a compressor 203, combustor 205 and a turbine section 207. The walls within the boxed region 201 are shown in a portion of the turbine engine 200 which can benefit from inclusion of channels walls including disclosed multi-portion indented features 103, comprising the hot-gas-path sections from the beginning on the combustor 205 to the end of the turbine section 207.

Figure 5A:
Figure 5B:
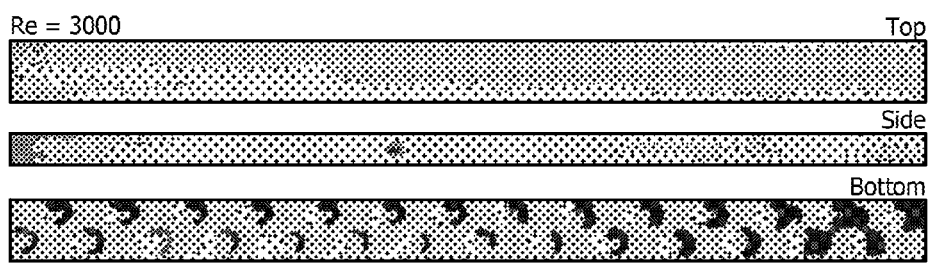
Figure 5C:
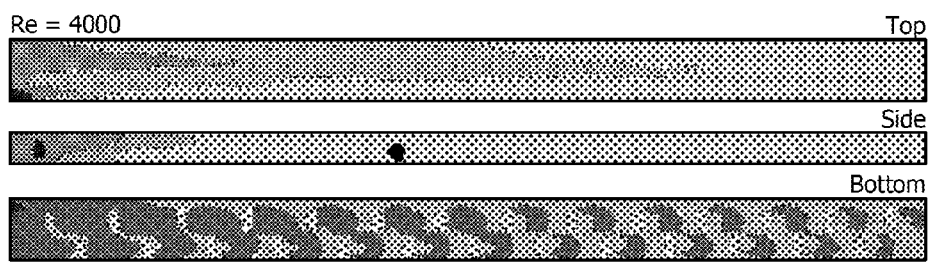
Figure 5D:
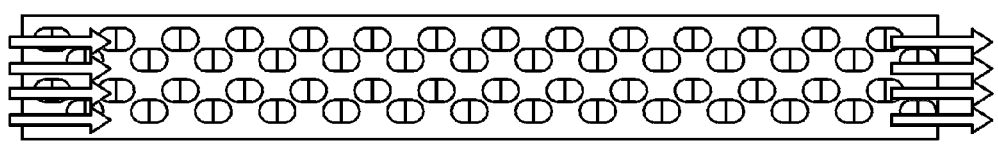
FIG. 5D shows a depiction of the layout of the DDs on the bottom channel wall that is analogous to the top view as shown in FIG. 1C.

The turbine engine 200 thus has at least one channel wall having a disclosed heat transfer augmented surface exposed to a hot fluid flow path where the multi-portion indented features are integrated into the wall in region 201 of the turbine section 207, such as a periodic 2D array of such features (such as shown in FIG. 5D described below). The flow augmenting multi-portion indented features may also be placed anywhere fluid flow occurs with the turbine engine 200, such as the walls of the combustor 205, walls of the stator region, walls of the turbine section 207, walls of the compressor 203 region, and walls of the hot exhaust region, etc. A coolant flow channel for flowing coolant fluid therethrough may be thermally coupled to the channel walls having the plurality of multi-portion indented features.

As known in the field of heat transfer, the Nusselt number is a dimensionless number used in the study of forced convection which gives a measure of the ratio of the total heat transfer to conductive heat transfer, and is equal to the heat-transfer coefficient times a characteristic length divided by the thermal conductivity. Nusselt number augmentation is the improvement of the channel Nusselt number with an applied feature (Nu) divided by the Nusselt number of an identical channel with no transport-enhancing features ($Nu_o$). This augmentation value provides a quantitative metric by which the heat transfer performance of the feature can be evaluated.

Figure 4:
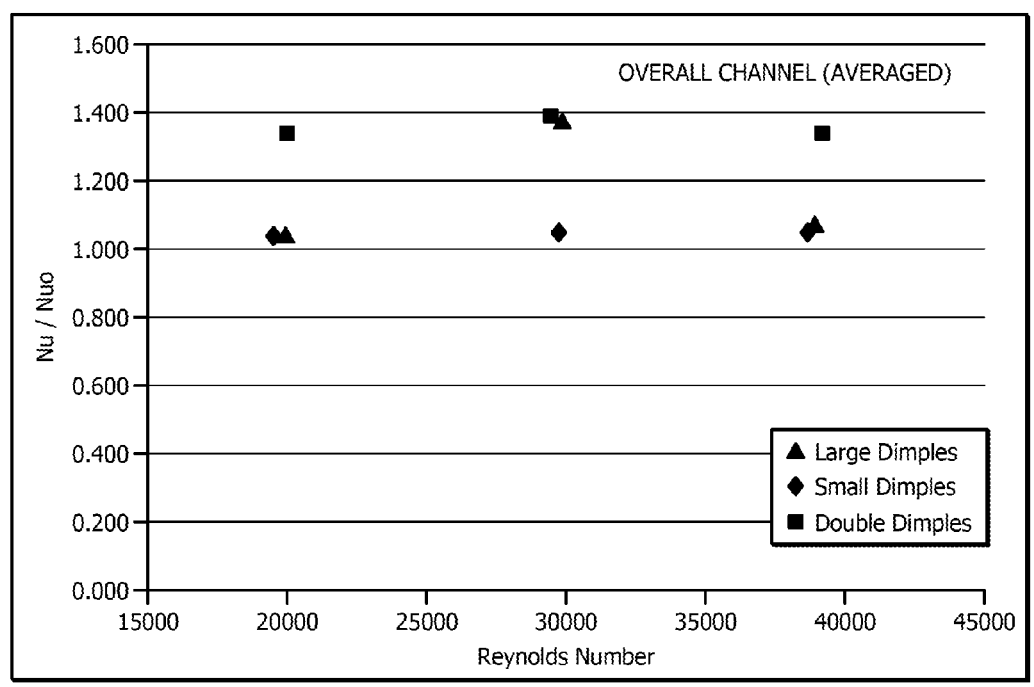
FIG. 4 is a Nusselt number augmentation versus Reynolds number plot for the overall channel (averaged) of a rectangular duct for conventional small dimples (SD) and conventional large dimples (LDs), and disclosed double dimple (DD) features according to an example embodiment.

FIG. 4 shows a Nusselt number augmentation versus Reynolds number plot for the overall channel (averaged) of a rectangular duct for different bottom wall designs including conventional small standard single hemispherical dimples, conventional large standard single hemispherical dimples, and example disclosed multi-portion indented features (shown as "double dimples") based on an arrangement of features shown in FIG. 1B, according to an example embodiment. The radius in inches, distance between dimples in a given row (center to center) in inches, and a maximum depth in inches for the conventional small standard single hemispherical dimple embodiment was 0.358, 0.665, and 0.12 respectively, and for the conventional large standard single hemispherical dimple embodiment was 0.533, 0.665, and 0.12 respectively. For the example double dimple, the first and second radius was 0.3 inches, the distance between the first and second midpoint was 0.17 inches, and the maximum depth was 0.12 inches. It can be seen that the disclosed double dimples provide a significant thermal conduction augmentation for surfaces throughout the range of Reynolds numbers tested, whereas conventional single dimple designs only provide substantial augmentation at much smaller Reynolds number ranges.

Disclosed multi-portion indented feature as described above may also be created on a separate structure, such as a block, and then secured to the channel walls of a fluid flow device. Also, the multi-portion indented features may be integrated on a fluid flow device's channel walls. A combination of an integral indentation and a fitted indentation apparatus is also possible. Generally, any number of multi-portion indented features may be employed.

In some particular embodiments, the multi-portion indented features are intersecting hemispherical double dimples having a first and second radius from 0.2 to 0.4 inches, a distance between the first and second midpoint between 0.13 to 0.21 inches and a maximum depth of 0.09 to 0.15 inches.

In some embodiments, the multi-portion indented features are in an array where a first row, having at least one multi-portion indented feature on the row, where the first and second midpoint are along the line defining the row, have their midpoints a distance from a reference line between 0.29 and 0.49 inches. Also, a second row, having at least one multi-portion indented feature on the row, where the first and second midpoint are along the line defining the row, have their midpoints a distance from a reference line approximately equal to 0.77 to 0.97 inches. A multi-portion indented feature in the second row may have a distance of 0.8 to 1.2 inches from the center of the multi-portion indented feature in the second row to the leading edge of a multi-portion indented feature in the first row. Also, the distance from the leading edge of a first multi-portion indented feature in the first row to the trailing edge of a second multi-portion indented feature in the first row may be 1.6 to 2.4 inches.

To create integral surfaces having disclosed multi-portion indented features, in some embodiments, it is possible to remove material from a given surface in an appropriate way, such as by machining to form two or three single spherical dimples having a sufficiently close proximity to each other so that they intersect, to form ridges at their planes of intersection. As described above, when the dimples are hemispherical, the ridges are semi-circular ridges. The arc length may not be a full semi-circle and the dimple not a full hemisphere, but it will be a curve with a constant radius. Other formation methods may also be used, such as milling with a spherical bit, casting, gnarling, molding, and laser etching/ablating.

A method of increasing heat transfer comprises providing at least one disclosed heat transfer augmented channel wall within an apparatus that utilizes a hot fluid flow during operation. A fluid flow is allowed to flow over the channel wall during operation of the apparatus. As described in the Examples below, disclosed channel walls having multi-portion indented features promote increased turbulent mixing in the hot fluid flow, causing better mixing of the hot fluid which increases convective heat transfer efficiency within the apparatus beyond that provided by conventional channels walls having single dimples, without a significant increase in friction.

EXAMPLES

Disclosed embodiments are further illustrated by the following specific Examples, which should not be construed as limiting the scope or content of this Disclosure in any way. Although some theory and mechanisms are provided below that are believed to be accurate, disclosed embodiments may be practiced irrespective of the accuracy of the theory and mechanisms provided.

The heat transfer augmentation through a fully-developed portion of a narrow rectangular duct (aspect ratio (AR)=2) was characterized by the application of various dimple geometries to the bottom wall of the channel, including a large dimple (LD), a small dimple (SD), and a disclosed double dimple (DD). The parameters of the various dimple geometries are listed in Table 1 shown below. The LD had the largest dimple radius (R) and dimple depth (d), whereas the SD has a smallest dimple radius and dimple depth. The DD had an overall footprint between the LD and SD. The DD geometry comprised two small dimples incorporated into one compound feature, such as depicted in FIGS. 1A-C. The upstream and downstream dimple of the DD were are identical and both had an equal radius to the SD that were offset in the streamwise position by 0.367d and aligned in the spanwise direction. The DD and SD arrays also had identical streamwise and spanwise pitch (P). The dimple density is also listed as a percentage of the projected flat area of the bottom wall covered by the overall dimple footprint. H is the channel height, delta ($\delta$) is the dimple depth, and S is the streamwise dimple pitch.

TABLE 1

Geometric, Non-dimensional Dimple Parameters

| Geometry | R/d | H/d | $\delta$/d | P/d | S/d | Dimple Density |
|---|---|---|---|---|---|---|
| SD | 0.64 | 1.33 | 0.26 | 1.00 | 1.41 | 21% |
| LD | 0.65 | 0.95 | 0.24 | 0.42 | 1.00 | 41% |
| DD | 0.64 | 1.33 | 0.26 | 1.00 | 1.41 | 30% |

Channel walls having arrays of SD, LD and DD dimple geometries were studied at channel Reynolds numbers of 20000, 30000, and 40000. The purpose was to understand the contribution of disclosed dimple geometries in the formation of flow structures that improve the advection of heat away from the channel walls. Experimental data obtained included local heat transfer coefficient distributions, channel-averaged Nusselt number augmentation, and overall friction augmentation throughout the length of the duct. The LD feature was found to promote significant intensification of convective heat transfer, as high as eighty percent, at a Reynolds number of 30000. Furthermore, disclosed DD surface features were found to promote heat transfer augmentation comparable to the large dimple feature, while only accompanied by the pressure loss penalty of the modest SD.

Experimental Data

An investigation of the fundamental flow physics responsible for the observed significantly improved cooling performance. Advanced laser-based flow-field diagnostic tools were used to measure velocity and vorticity fields in a number of flow planes. This information provided insights into the production of turbulence in the near-wall region of the flow, promoting improved advection of heat from the channel walls.

As disclosed above, DD surface features can be a combination of two small dimples machined in pair with a center-to-center distance that is smaller than the footprint diameter (d). An interesting phenomenon for channel walls having disclosed DD surface features observed is shown in FIGS. 5A-C, comprising top, side and bottom channel wall (only the bottom wall had DDs) Nusselt number performance as a function of wall position at channel Reynolds numbers of 20000, 30000, and 40000, respectively, where the bottom wall included DDs, where the size of the recirculation zone is reduced to a very small percentage of the overall dimple surface area, much less than any single dimple feature tested in this Example. FIG. 5D shows a depiction of the layout of the DDs on the bottom channel wall depicting a staggered row, racetrack configuration that is analogous to the top view as shown in FIG. 1C, along with the fluid flow shown oriented parallel to the length dimension of the DD features. Although only four (4) rows and twenty-eight (28) columns of features are shown, disclosed channel walls may have many more rows and columns.

The result obtained evidence high heat transfer uniformity and overall high performance for the flow channel as a whole. At a channel Reynolds number of 20000 (FIG. 5A), disclosed DDs were found to function well in the promotion of turbulent advection of heat from the channel surface in the downstream region near the edge of the DD feature. However, at this Reynolds number, no significant Nusselt number augmentation was recorded on the unfeatured top and side walls. This is likely because the mainstream flow does not possess the needed kinetic energy for the augmentation features to promote such an effect.

As the channel Reynolds number is increased, the inherent turbulence of the flow is increased and the heat transfer performance of the side and top walls is increased. It observed that the top wall has a higher average heat transfer coefficient through the fully-developed portion than the side wall for the 30000 (FIG. 5B) and 40000 (FIG. 5C) Reynolds number cases. This can be thought to be counter-intuitive when considering the wall's proximity to the feature. It is the channel aspect ratio that likely causes this to take place. In this example, the height of the channel is one half of the channel width; resulting in a more extreme velocity gradient through the hydrodynamic boundary layer between then top and bottom walls than the boundary layer between the two side walls. The result is likely that higher velocity fluid is within closer proximity to the top wall than the side walls, resulting in a higher heat transfer coefficient.

At a channel Reynolds number of 40000, the DDs were found to promote significant gains in surface Nusselt number on the bottom walls of the channel. The downstream dimple of the DD pair is seen to exhibit Nusselt number values as high as those recorded on the bottom wall just downstream of the dimple. The combination appears to work in harmony, where the first dimple in the DD exhibits the same stagnation-recirculation characteristics observed from the single SD, then the second dimple of the DD uses the increased turbulent kinetic energy for increased convection heat transfer from its own walls and then further promotes increased vortex generation to be swept downstream. The evidence of these phenomena can be clearly seen through the local contours presented in FIGS. 5A-C, where the Nusselt number in each dimple throughout the fully-developed portion is seemingly staged as the flow transitions through the three stages described above.

Figure 6A:
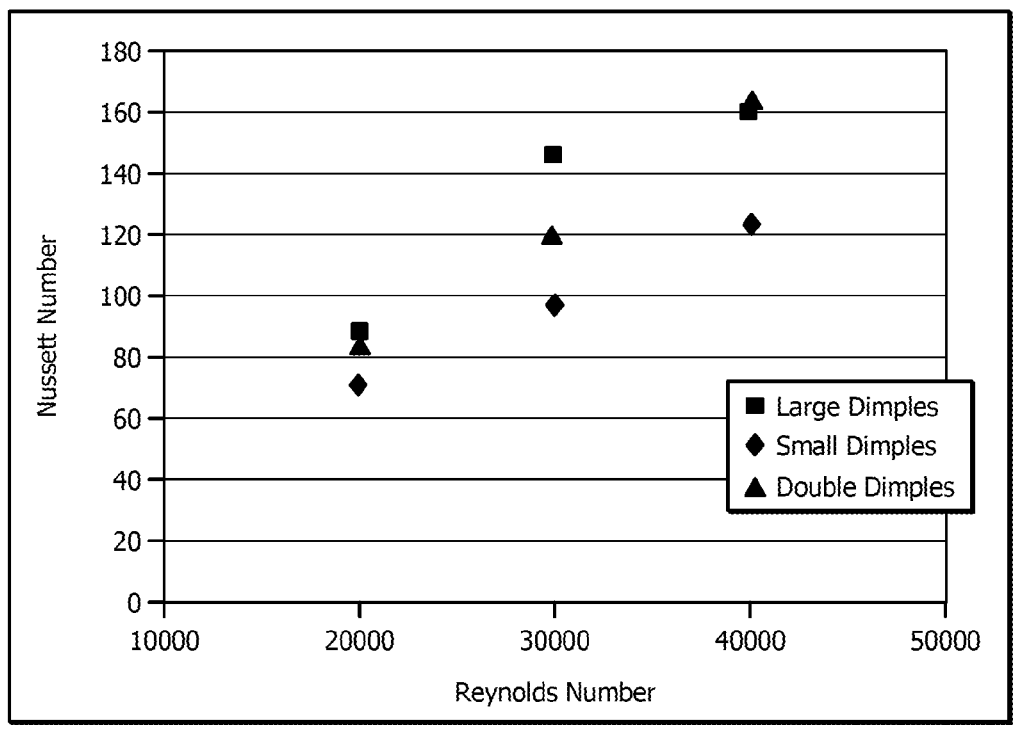
FIG. 6A is a Nusselt number vs. Reynolds number plot for disclosed DDs, as well as for conventional SDs and conventional large LDs.
Figure 6B:
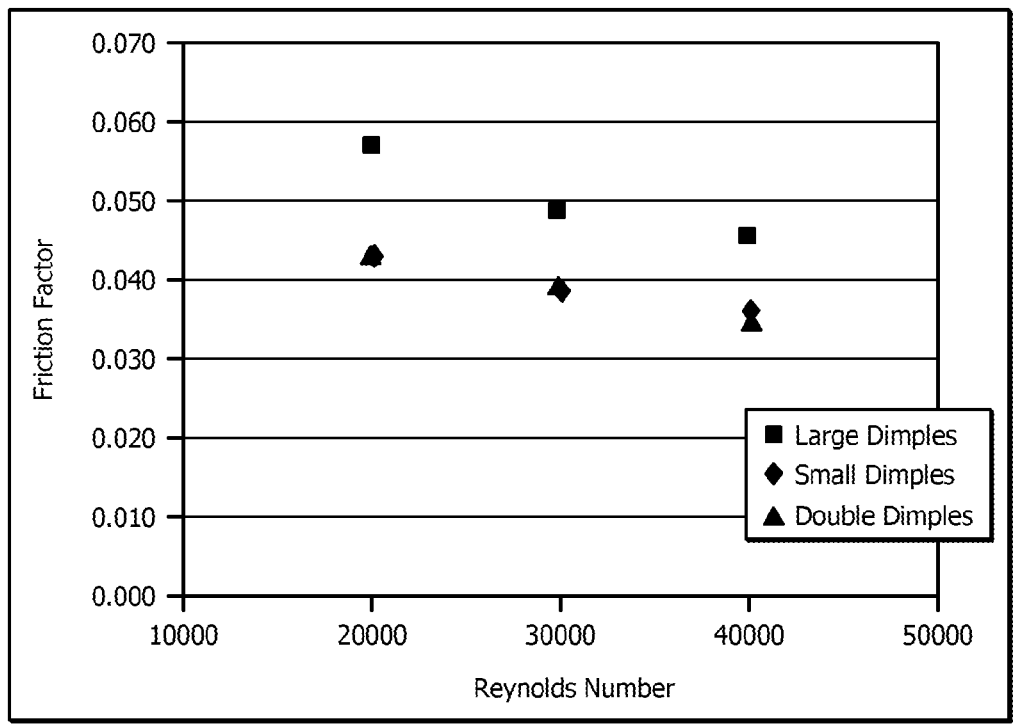
FIG. 6B is a friction factor vs. Reynolds number plot for disclosed DDs, as well as for conventional SDs and conventional LDs.

One significant observation is the performance of disclosed DD features. FIG. 6A provides a Nusselt number vs. Reynolds number plot showing the stream-wise averaged Nusselt number of the DDs is on the level of the LDs, being around twenty-five percent higher than that of the SDs. FIG. 6B provides a friction factor vs. Reynolds number plot showing the channel friction factor of the DDs is directly comparable to that of the SDs.

Figure 7:
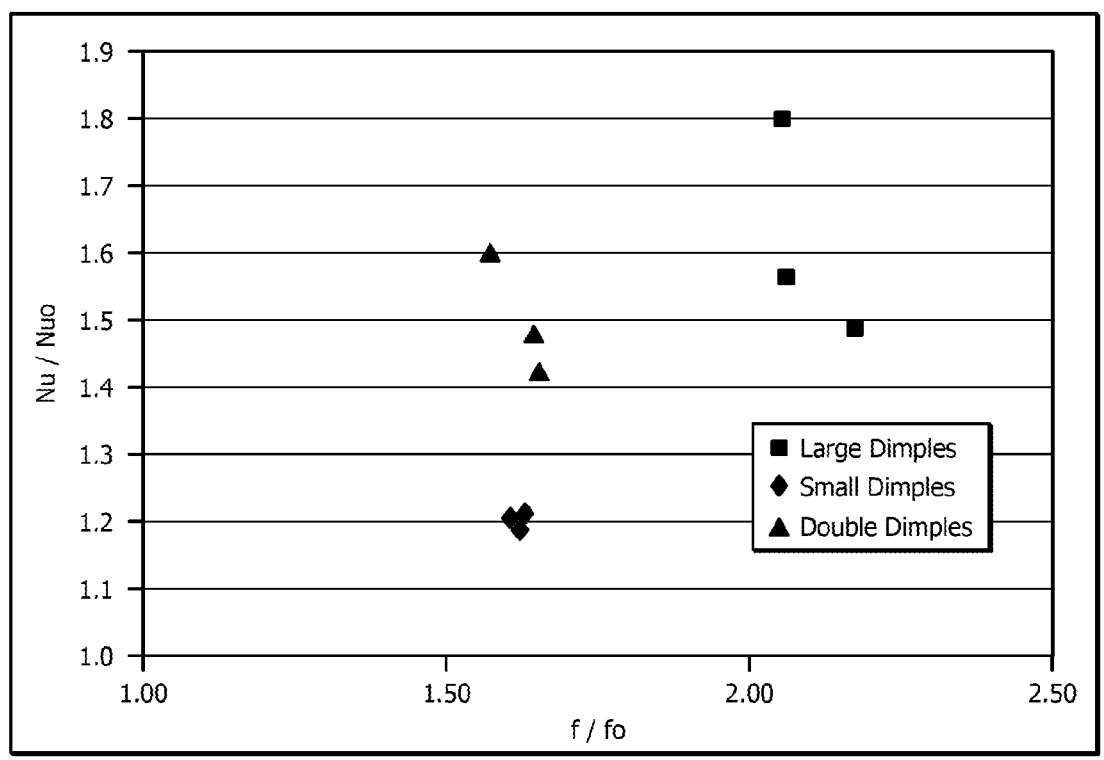
FIG. 7 is a channel Nusselt number vs. friction factor augmentation plot for channel walls having disclosed DDs, as well as for conventional SDs and LDs.

FIG. 7 is a channel Nusselt number (Nu/Nu$_0$) vs. friction factor augmentation plot (f/f$_0$) for channel walls having disclosed DDs that evidences the improved performance of the disclosed DD feature by direct comparison of the two most prominent metrics in flow augmenter design. The friction factor of a smooth walled (no features) channel is f$_0$, and f/fo is a measure of the percentage increase in flow friction (directly related to the pressure drop in the channel). FIG. 7 illustrates that a channel designed with disclosed DD surface features provides heat transfer performance that rivals the more aggressive LD feature, but with a markedly lower pressure loss penalty.

Comparison of Dimple Geometries:

The vorticity near the featured wall of the DD and SD case was found to be more concentrated than the LD (seen for all three tested Reynolds numbers, 20000, 30000, and 40000). The vorticity of the LD case was found to be more diffused and widespread, penetrating further towards the centerline of the channel. The differences in the mean vorticity of the three geometries help explain the differences in their pressure drop characteristics. The LD had the greatest friction augmentation, whereas the SD and DD had similar friction. The widespread and diffused vorticity of the LD also may help explain the large pressure drop (friction augmentation), where the shearing action of the walls is able to penetrate further into the core of the flow because of the increased and widespread mixing being promoted by the LD. On the other hand, for the SD and DD, the vorticity is concentrated near the walls and hence the Reynolds shear stress and overall pressure drop in these channels is less. The similarities in the vorticity layers of the SD and DD also support how these channels exhibited similar friction.

Regarding the SD and DD wall, the geometry of the feature is such that the generated vorticity is retained near the wall, promoting mixing near the wall. The near wall mixing brings colder fluid into close proximity of the hot wall and maintains a greater temperature gradient near the wall, the driving force of heat transfer to the cold fluid. However, heat transfer is more dependent on the local near wall mixing rather than the bulk flow, which the LD and DD accomplish better than the SD. These flow features of the DD help to explain how the DD is able to attain a high heat transfer enhancement without a significant increase in friction augmentation.

In conclusion, the observed flow field found is supportive of heat transfer results described with respect to Example 1 above. The LD is observed to promote diffused and widespread vorticity (and hence mixing) throughout the channel. The vorticity in disclosed DDs and SDs is localized near the wall, unlike the LDs. The unique and unexpected performance of the DD dimpled channel is believed to lie in large part on its ability to retain the vorticity generated in the dimple closer to the walls, efficiently promoting turbulent mixing near the walls without an additional increase in friction.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A turbine engine, comprising:
a compressor for pressurizing air to generate compressed air;
a combustion chamber for mixing said compressed air with fuel and combusting for generating a stream of hot combustion gases;
a turbine section for extracting energy from said stream of hot combustion gases;
a plurality of channel walls including a heat transfer augmented channel wall exposed to a flow path of said stream of hot combustion gases in at least one of said combustion chamber and said turbine section, said heat transfer augmented channel wall comprising:
a bulk portion;
a wall surface, and
a plurality of multi-portion indented features arranged in a two-dimensional (2D) array that is periodic in both dimensions of said 2D and is in a staggered row configuration extending from said wall surface into said bulk portion,
wherein said multi-portion indented features each comprise:
a first indented portion, and
at least a second indented portion,
wherein said first indented portion and said second indented portion are divided by a ridge which disrupts fluid flow between said first and second indented portions, and
wherein said ridge has a height that is less than a depth of said multi-portion indented features.

2. The turbine engine of claim 1,
wherein said first indented portion comprises a first rim wherein said first rim comprises a first intersection of said first indented portion and said wall surface, said first rim having a first circular profile comprising a first radius and a first midpoint, and
wherein said second indented portion comprises a second rim wherein said second rim comprises a second intersection of said second indented portion and said wall surface, said second rim has a second circular profile comprising a second radius and a second midpoint, said first midpoint and said second midpoint comprising a distance apart less than a sum of said first radius and said second radius, said distance apart being greater than zero.

3. The turbine engine of claim 1, wherein said plurality of multi-portion indented features are positioned after said combustion chamber in a flow direction of said hot combustion gases.

4. The turbine engine of claim 1, wherein said first and second indented portions both have a semispherical shape.

5. The turbine engine of claim 1, wherein said height of said ridge is from twenty to eighty percent of said depth, and wherein said ridge extends across the full width of said multi-portion indented features.

6. The turbine engine of claim 1, wherein a length dimension of said plurality of multi-portion indented features is aligned at 0 degrees to a flow direction of said stream of hot combustion gases.

7. The turbine engine of claim 1, wherein said multi-portion indented features are double dimples.

8. The turbine engine of claim 1, wherein a length dimension of said plurality of multi-portion indented features is aligned from 0 to 30 degrees relative to a flow direction of said stream of hot combustion gases.

9. A method of increasing heat transfer, comprising:
providing at least one heat transfer augmented channel wall within an apparatus that utilizes a hot fluid flow during operation, said channel wall comprising:
a bulk portion;
a wall surface, and
a plurality of multi-portion indented features arranged in a two dimensional (2D) array that is periodic in both dimensions of said 2D and is in a staggered row configuration extending from said wall surface into said bulk portion,
wherein said multi-portion indented features each comprise:
a first indented portion, and
at least a second indented portion, wherein said first indented portion and said second indented portion are divided by a ridge which disrupts fluid flow between said first and second indented portions, and
wherein said ridge has a height that is less than a depth of said multi-portion indented features, and
flowing a hot gas over said channel wall during operation of said apparatus.

10. The method of claim 9, wherein said apparatus comprises a turbine engine and said channel wall is within a combustor or turbine section of said turbine engine.

11. The method of claim 9, wherein a length dimension of said plurality of multi-portion indented features is aligned parallel to a flow direction of said hot fluid flow.

12. The method of claim 9, wherein said first and second indented portions both have a semispherical shape, and said plurality of multi-portion indented features are arranged in a periodic two-dimensional (2D) array.

13. The method of claim 9, wherein said height of said ridge is from twenty to eighty percent of said maximum depth, and wherein said ridge extends across the full width of said multi-portion indented features.

14. A heat transfer augmented channel wall, comprising:
a bulk portion;
a wall surface, and
a plurality of multi-portion indented features extending from said wall surface into said bulk portion, wherein said multi-portion indented features each comprise:
a first indented portion, and
at least a second indented portion, wherein said first indented portion and said second indented portion are divided by a ridge which disrupts fluid flow between said first and second indented portions, and
wherein said ridge has a height that is less than a depth of said multi-portion indented features, wherein said plurality of multi-portion indented features arranged in a two-dimensional (2D) array that is periodic in both dimensions of said 2D and is in a staggered row configuration.

15. The channel wall of claim 14, wherein said multi-portion indented features are double dimples.

* * * * *